United States Patent
Veprinsky et al.

(10) Patent No.: US 9,604,149 B2
(45) Date of Patent: Mar. 28, 2017

(54) PROVIDING A PHYSICAL INDICATION OF AN OBJECTIVE MET IN AN ENTERTAINMENT PLATFORM

(75) Inventors: Michael Veprinsky, Encino, CA (US); Allan D. Jones, Jr., Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 42 days.

(21) Appl. No.: 13/099,841

(22) Filed: May 3, 2011

(65) Prior Publication Data

US 2012/0283019 A1  Nov. 8, 2012

(51) Int. Cl.
| | | |
|---|---|---|
| G06Q 30/00 | (2012.01) | |
| A63F 9/24 | (2006.01) | |
| A63F 13/85 | (2014.01) | |
| A63F 13/69 | (2014.01) | |
| G06Q 30/06 | (2012.01) | |
| A63F 13/792 | (2014.01) | |

(52) U.S. Cl.
CPC .............. *A63F 13/85* (2014.09); *A63F 13/69* (2014.09); *G06Q 30/0601* (2013.01); *A63F 13/792* (2014.09); *A63F 2300/575* (2013.01); *A63F 2300/609* (2013.01); *A63F 2300/61* (2013.01)

(58) Field of Classification Search
CPC ........................................................ A63F 9/24
See application file for complete search history.

(56) References Cited

U.S. PATENT DOCUMENTS

| | | | |
|---|---|---|---|
| 5,290,033 A * | 3/1994 | Bittner et al. ................. 463/25 |
| 6,907,400 B1 | 6/2005 | Matsko et al. | |
| 7,156,733 B2 | 1/2007 | Chiang et al. | |
| 7,465,212 B2 * | 12/2008 | Ganz ............................ 446/175 |
| 7,749,089 B1 * | 7/2010 | Briggs et al. ................. 472/136 |
| 8,235,814 B2 | 8/2012 | Willis et al. | |
| 8,388,451 B2 | 3/2013 | Auterio et al. | |
| 8,407,090 B2 | 3/2013 | Kitchen et al. | |
| 8,540,562 B2 | 9/2013 | Roper et al. | |
| 2002/0116266 A1 | 8/2002 | Marshall | |
| 2004/0192429 A1 * | 9/2004 | Moody ........................... 463/16 |
| 2005/0026685 A1 * | 2/2005 | Ruark et al. ..................... 463/31 |
| 2005/0075889 A1 | 4/2005 | Gomes et al. | |
| 2005/0266259 A1 * | 12/2005 | Layton ................... B44C 5/005 428/542.4 |

(Continued)

*Primary Examiner* — James S McClellan
*Assistant Examiner* — Syvila Weatherford
(74) *Attorney, Agent, or Firm* — Patterson + Sheridan, LLP

(57) ABSTRACT

A method for enabling purchases of status items associated with an online virtual game is disclosed. The method involves: determining that a player of the online virtual game has achieved a first objective defined in the online virtual game, and informing an online store that the player has achieved the first objective. The online store is configured to allow the player to purchase a first status item for achieving the first objective. The first status item comprises a real-world indication that the player has achieved the first objective. The online store is configured to allow a particular player to purchase a particular status item associated with achieving a particular objective in the online virtual game that conveys that the particular player has, in fact, achieved the particular objective. The online store is configured to not allow the particular player to purchase the particular status item without actually having achieved the particular objective.

21 Claims, 6 Drawing Sheets

(56) References Cited

U.S. PATENT DOCUMENTS

| | | |
|---|---|---|
| 2006/0111973 A1 | 5/2006 | Brown et al. |
| 2006/0184419 A1 | 8/2006 | Postrel |
| 2006/0211482 A1* | 9/2006 | Pimienta et al. ............... 463/16 |
| 2006/0259361 A1 | 11/2006 | Barhydt et al. |
| 2007/0129990 A1 | 6/2007 | Tzruya et al. |
| 2008/0004093 A1* | 1/2008 | Van Luchene et al. .......... 463/1 |
| 2008/0141367 A1* | 6/2008 | Ganz et al. ..................... 726/21 |
| 2008/0201224 A1 | 8/2008 | Owens et al. |
| 2008/0227538 A1* | 9/2008 | Kelly ...................... A63F 3/081 463/27 |
| 2009/0144140 A1 | 6/2009 | Willis et al. |
| 2009/0156310 A1 | 6/2009 | Fargo |
| 2009/0186695 A1 | 7/2009 | Willis et al. |
| 2009/0191962 A1* | 7/2009 | Hardy et al. .................... 463/29 |
| 2009/0248544 A1* | 10/2009 | Ganz ............................... 705/27 |
| 2009/0280908 A1* | 11/2009 | Carroll et al. .................. 463/42 |
| 2010/0009750 A1* | 1/2010 | Egozy et al. ................... 463/35 |
| 2010/0030660 A1* | 2/2010 | Edwards ........................ 705/27 |
| 2010/0041481 A1* | 2/2010 | Smedley et al. ............... 463/42 |
| 2010/0145797 A1* | 6/2010 | Hamilton et al. ......... 705/14.49 |
| 2011/0086712 A1* | 4/2011 | Cargill ............................ 463/42 |
| 2011/0093349 A1 | 4/2011 | Drescher et al. |
| 2011/0159964 A1* | 6/2011 | Schiappa et al. ............... 463/42 |
| 2011/0302023 A1 | 12/2011 | Thye et al. |
| 2011/0313827 A1 | 12/2011 | Lobb et al. |
| 2012/0130796 A1 | 5/2012 | Busch |
| 2012/0136465 A1 | 5/2012 | Guinn et al. |
| 2012/0172131 A1* | 7/2012 | Boswell et al. ................ 463/42 |
| 2012/0185310 A1 | 7/2012 | Greenspun |
| 2012/0244948 A1 | 9/2012 | Dhillon et al. |
| 2012/0315993 A1 | 12/2012 | Dumont et al. |

\* cited by examiner

PROVIDING A PHYSICAL INDICATION OF AN OBJECTIVE MET IN AN ENTERTAINMENT PLATFORM

BACKGROUND OF THE INVENTION

Field of the Invention

The present invention relates generally to entertainment platforms and, more specifically, to a system and method for providing a physical indication of an objective met in an entertainment platform.

Description of the Related Art

During the last few decades, entertainment platforms for online virtual games have greatly increased in popularity. The range of available online virtual games ranges from board games such as chess and checkers to war/battle simulation games to childcare-type games. Online virtual games are popular because, among other reasons, online virtual games provide players challenges and entertainment for hours while requiring relatively little real-world equipment. Also, online virtual games provide an activity in which one can engage when friends or family are not around.

Typically, online virtual games require players to achieve one or more objectives during the course of the game, and the success of a particular player is then measured by how many of those objectives the player can meet during the game. For example, a battle/war online virtual game may require a player to kill a certain number of opponents and/or to bomb a certain number of targets in order to meet an objective. Other online virtual games may implement multiple levels, where a player who is successful at meeting the objectives presented in a particular level of the game would be promoted to the second level of the game, where the player would be presented with different objectives. After meeting an objective, the player is typically informed that the player has met an objective. Oftentimes, this information is provided on the screen.

As is fairly well-known, many online virtual games present virtual achievement ornaments that are tied to particular objectives in the games to the players of the games. For example, a pirate-type online virtual game may be structured to present a virtual representation of a sword to a player when he/she achieves a certain level of notoriety in the game. One drawback to presenting players with virtual achievement ornaments is that there is no physical permanence to such ornaments. Therefore, a player in an online virtual game has no way to demonstrate outside the online virtual gaming environment that the player has met certain objectives in the game.

One drawback in online virtual gaming environments and online stores is that online virtual games do not share information with online stores that sell products representing the meeting of objectives in online virtual games. As such, a player in an online virtual game has no way to demonstrate outside the online virtual gaming environment that he/she has met the objectives in the game.

As the foregoing illustrates, what is needed in the art is a representation of an objective met in a virtual gaming environment that is not tied to a computer screen.

SUMMARY OF THE INVENTION

One embodiment of the present invention sets forth a method for enabling access to status items associated with an entertainment platform. The method includes the steps of determining that a player of the entertainment platform has achieved a first objective defined in the entertainment platform and providing an indicia that the player has achieved the first objective. A store is configured to allow the player to purchase a first status item for achieving the first objective in response to the indicia that the player has achieved the first objective. The first status item comprises a real-world indication that the player has achieved the first objective. The store is configured to allow a particular player to purchase a particular status item associated with achieving a particular objective in the entertainment platform that conveys that the particular player has, in fact, achieved the particular objective; and the store is configured to not allow the particular player to purchase the particular status item without actually having achieved the particular objective.

One advantage of the disclosed method is that a player in entertainment platform can obtain status items that represent her accomplishments in the entertainment platform and are not tied to a computer screen. As a result, the player in the entertainment platform can more easily display her success in the entertainment platform to her friends and family.

BRIEF DESCRIPTION OF THE DRAWINGS

So that the manner in which the features of the present invention can be understood in detail, a more particular description of the invention may be had by reference to example embodiments, some of which are illustrated in the appended drawings. It is to be noted, however, that the appended drawings illustrate only example embodiments of this invention and are therefore not to be considered limiting of its scope, for the invention may admit to other equally effective embodiments.

DETAILED DESCRIPTION

Figure 1:
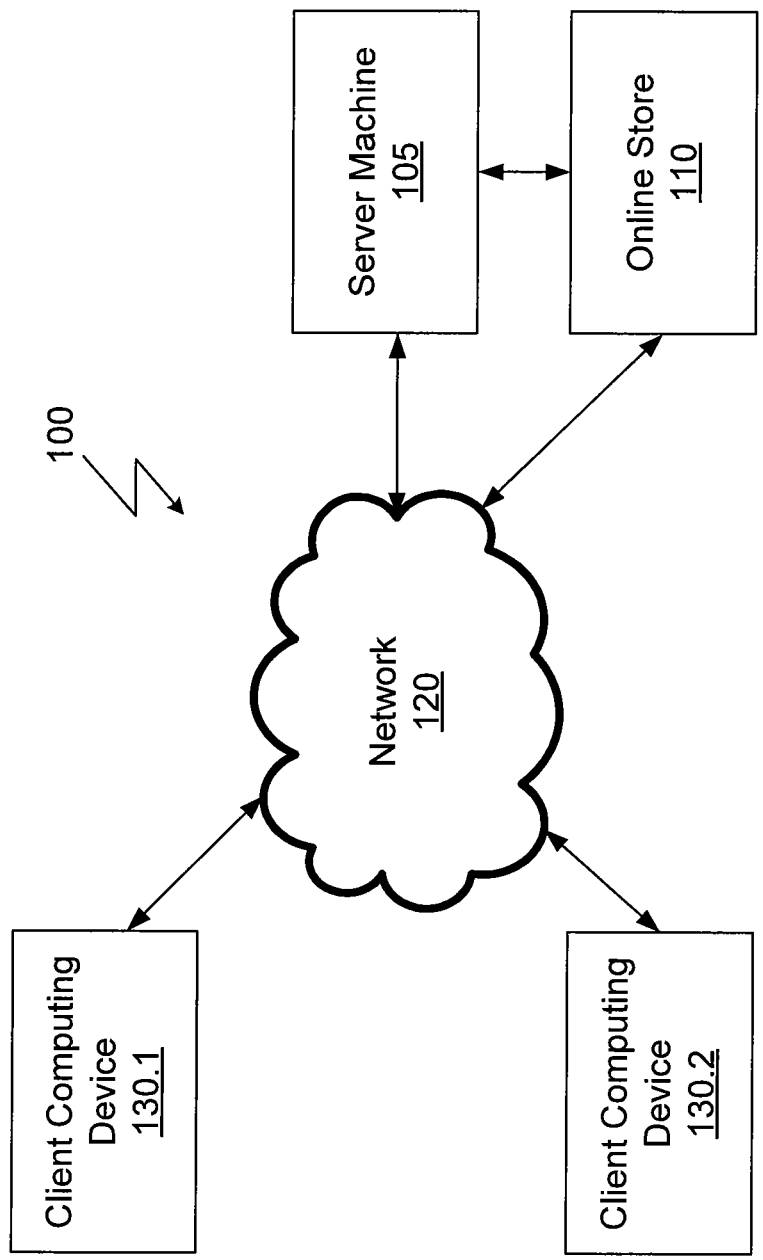
FIG. 1 illustrates a computing system configured to implement one or more aspects of the present invention.

FIG. 1 illustrates a computing system configured to implement one or more aspects. As shown, the computing system 100 includes a server machine 105 connected to an online store 110 and a plurality of client computing devices 130, including client computing device 130.1 and client computing device 130.2. These systems are connected to one another via a network 120. The network 120 may be Internet, an intranet, a wired or wireless local area network (LAN), a cellular network such as GSM or CDMA, or other computer network.

Illustratively, the server machine 105 is a game server configured to provide an entertainment platform which allows players to play one or more online virtual games. Players access the server machine 105 from client computing devices 130 connected to the network 120. While only one server machine 105 is illustrated in FIG. 1, those skilled in the art would understand that the techniques described herein could be implemented with one or more server machines 105. In one embodiment, a plurality of server machines 105 operate in concert. The operation of the server machine 105 is described in more detail below in conjunction with FIG. 3.

The online store 110 is configured to sell real-world items, including physical items such as toys, ornaments, trophies, certificates and/or clothes, to customers. Customers access the online store 110 from client computing devices 130 connected to the network 120. While only online store 110 is illustrated in FIG. 1, those skilled in the art would understand that the techniques described herein could be implemented with one or more online stores 110. In one embodiment, some of the customers of the online store 110 are also players of a game that is played on server machine 105, and online store 110 sells products that are related to the game that is played on server machine 105. The operation of the online store 110 is described in more detail below in conjunction with FIG. 5.

Each client computing device 130 could be a laptop or desktop computer, a virtual machine, a cluster of computers comprising one or more virtual machines, a PDA, a mobile phone or any other computing device or set of devices capable of connecting to a network. The client computing device 130 is configured to access the server machine 105 and/or the online store 110 through either a general purpose application, such as a web browser, or a special purpose application for accessing the server machine 105 and/or the online store 110. The operation of the client computer system is described in more detail below in conjunction with FIG. 2.

Figure 2:
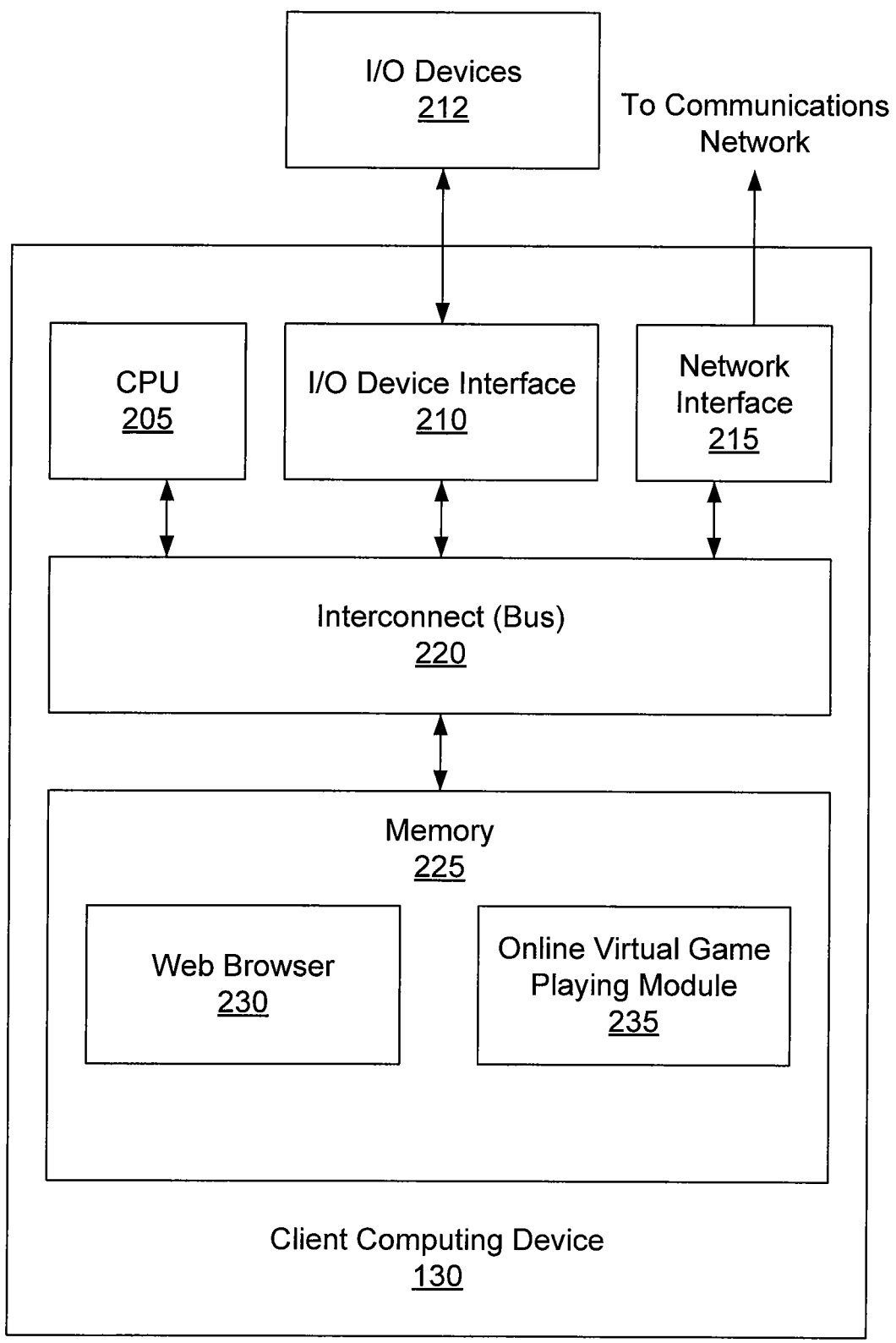
FIG. 2 is a more detailed illustration of the client computing device of FIG. 1, according to one embodiment of the present invention.

FIG. 2 is a more detailed illustration of the client computing device 130 of FIG. 1, according to one embodiment. As shown, the client computing device 130 includes, a central processing unit (CPU) 205, a network interface 215, an interconnect 220, and a memory 225. The client computing device 130 may also include an input/output (I/O) devices interface 210 connecting I/O devices 212 (e.g., keyboard, display and mouse devices) to the client computing device 130.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. The memory 225 includes random access memory (RAM), a hard disk drive and/or a flash memory storage drive.

As shown, the memory 225 includes a web browser 230 and an online virtual game playing module 235. As is well-known, the web browser 230 is a general purpose application for accessing many different web pages. In one embodiment, the web browser may be configured to access a page associated with server machine 105 and/or online store 110. Using the web browser 230, a user of the client computing device 130 could interact with the online store 110 as a customer in the online store or with the server machine 105 as a player in an online virtual game.

According to one embodiment, the memory 225 also includes an online virtual game playing module 235. The online virtual game playing module 235 is a special purpose application configured to allow the user of the client computing device 130 to interact with the server machine 105 as a player in a game implemented on server machine 105. In one embodiment (not illustrated), the online virtual game playing module 235 may be a part of the web browser 230. In another embodiment, the online virtual game playing module 235 is a separate and distinct application from web browser 230.

Figure 3:
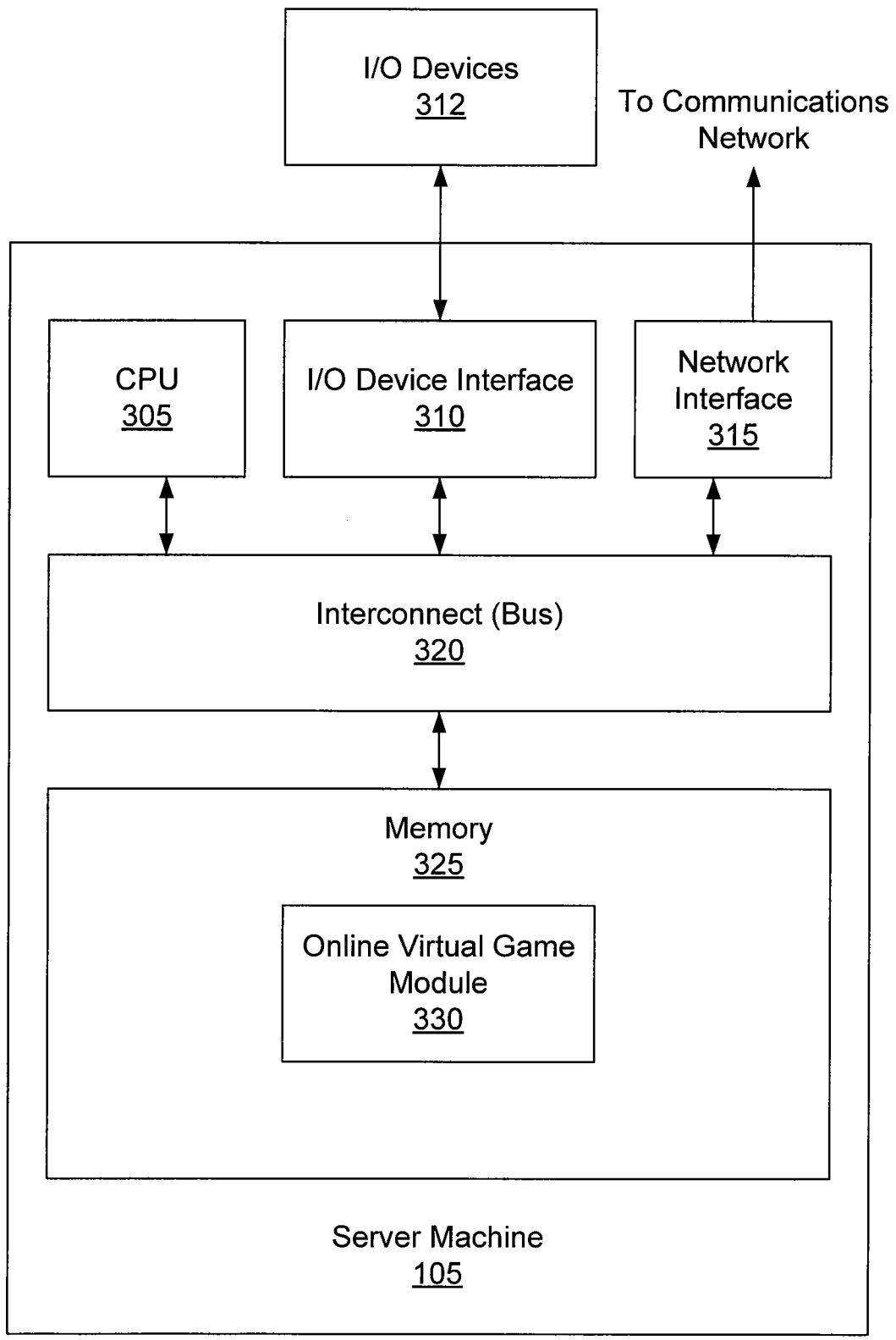
FIG. 3 is a more detailed illustration of the server machine of FIG. 1, according to one embodiment of the present invention.

FIG. 3 is a more detailed illustration of the server machine 105 of FIG. 1, according to one embodiment. As shown, server machine 105 includes a central processing unit (CPU) 305, a network interface 315, an interconnect 320, and a memory 325. The server machine 105 may also include an input/output (I/O) device interface 310 connecting I/O devices 312 (e.g., keyboard, display, and mouse devices) to the server machine 105.

As shown, the memory 325 includes an online virtual game module 330. The online virtual game module 330 contains instructions that, when executed, cause the server machine 105 to allow one or more players, accessing the server machine 105 through client computing devices 130 to play an online virtual game. The online virtual game module 330 is described in more detail in conjunction with FIG. 4.

In one embodiment, any other entertainment platform, such as a video game, interactive television show, etc. could perform the functions associated with the online virtual game playing module 235, and any back-end server supporting such an entertainment platform could perform the functions associated with the online virtual game module 330.

Figure 4:
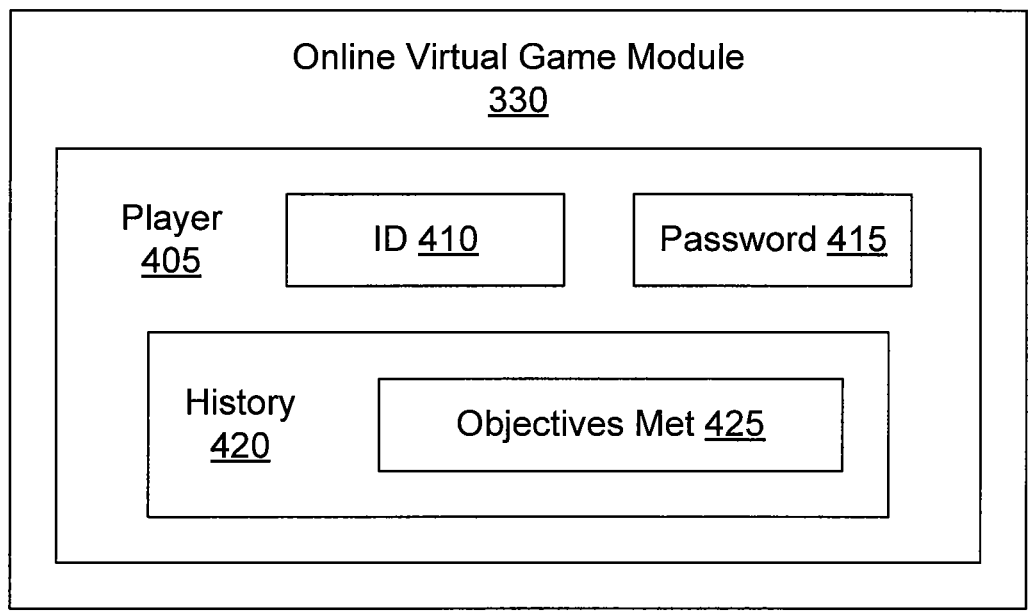
FIG. 4 is a more detailed illustration of logic implemented by the online virtual game module of FIG. 3, according to one embodiment of the present invention.

FIG. 4 is a more detailed illustration of logic implemented by the online virtual game module 330 of FIG. 3, according to one embodiment. As shown, the online virtual game module 330 includes a player 405. While only one player 405 is illustrated in FIG. 4, persons skilled in the art would understand that multiple players 405 may also be implemented. Typically, each player 405 corresponds to a human player who plays the online virtual game through one or more client computing devices 130, which have the online virtual game playing module 235 installed thereon.

As shown, each player includes an identifier (ID) 410, a password 415, and a history 420. Typically, the human player enters login information including the ID 410 and password 415 in order to access the online virtual game module 330 through an online virtual game playing module 235 on a client computing device 130. Alternatively, the ID 410 and password 415 of player 405 may be associated with an email or social networking service. Persons skilled in the art will recognize other techniques may be used for authenticating players. For example, cookies may be stored on a client computing device 130 associated with player 405. When the player 405 subsequently attempts to access the online virtual game module 330, the cookies stored on the client computing device 130 are read by the online virtual game module 330 to authenticate the player 405. The history 420 stores information about the past interaction of the player 405 with the online virtual game module 330. As shown, the history 420 includes logic representing objectives met 425. In one embodiment, the objectives met 425 represent the objectives in the online virtual game that the player 405 has met. In one implementation, the objectives met 425 include accomplishments that the player 405 has achieved, such as reaching a certain level in the online virtual game, completing a quest in the online virtual game, defeating a certain number of opponents in the online virtual game or obtaining a certain ranking in the online virtual game.

Figure 5:
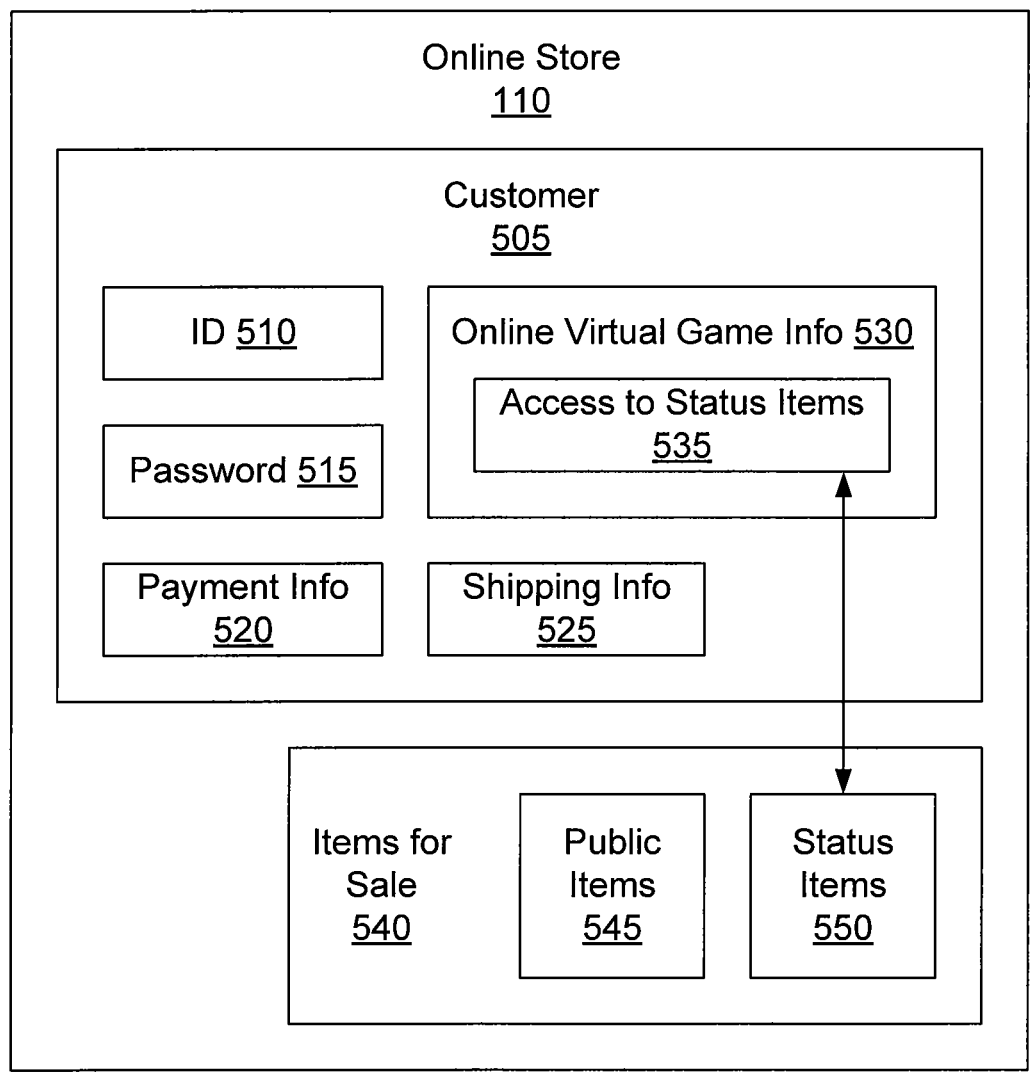
FIG. 5 is a more detailed illustration of logic implemented by the online store of FIG. 1, according to one embodiment of the present invention.

FIG. 5 is a more detailed illustration of logic implemented by the online store 110 of FIG. 1, according to one embodiment. As shown, the online store 110 includes a customer 505 and items for sale 540. While only one customer 505 is illustrated in FIG. 5, persons skilled in the art would understand that multiple customers 505 could be implemented.

As shown, the items for sale 540 include public items 545 and status items 550. Public items 545 are available for purchase by all customers 505. Status items 550 are only available for purchase by a subset of customers 505. In one embodiment, status items 550 are only available for purchase by those customers 505 who are also players 405 in the online virtual game implemented on the server machine 105 and who have certain objectives met 425. Those skilled in the art would understand that items for sale 540 include physical and/or real-world items, such as toys, ornaments, clothes, trophies, certificates and/or accessories.

As shown, each customer 505 includes an identifier (ID) 510, a password 515, payment information 520, shipping information 525, and online virtual game information 530. Alternatively, the ID 510 and password 515 of customer 505 may be associated with an email or social networking service. Typically, the human customer enters login information including the ID 510 and password 515 in order to access the online store via either a web browser 230 or a special purpose application installed on a client computing device 130 accessible to the human customer. In one embodiment, the customer 505 corresponds to a player 405 in the online virtual game module 330, and the ID 510 and password 515 of the customer to access the online store 110 are the same as the ID 410 and password 415 of the player to access the online virtual game module 330. In another embodiment, the ID 510 and password 515 of the customer 505 are different from the ID 410 and password 415 of the player, even though the customer 505 and the player 405 correspond to the same human customer/player. Persons skilled in the art will recognize other techniques exist for authenticating customers. For example, cookies may be stored on a client computing device 130 associated with customer 505. When the player 405/customer 505 subsequently attempts to access the online store 110, the cookies stored on the client computing device 130 are read by the online store 110 to authenticate the player 405/customer 505.

The payment information 520 stores information regarding how customer 505 pays for items for sale 540 that she purchases. In one embodiment, the payment information 520 includes credit card information or bank account information. The shipping information 525 stores information regarding how customer 505 receives items for sale 540 that she purchases. In one embodiment, the shipping information 525 includes a mailing address. In one embodiment, a physical store having a brick and mortar presence may be implemented in place of an online store. The physical store may save biometric information (e.g. facial recognition) of its customers, or give customers a key chain, mobile-phone based, or wallet-sized loyalty card to identify them. In one embodiment, the loyalty card implements radio frequency identification (RFID) technology.

The online virtual game information 530 includes information about the experience of the customer 505 with being a player 405 in an online virtual game implemented on server machine 105. As shown, the online virtual game information 530 includes information regarding access to status items 535. In one embodiment, the access to status items 535 is a Boolean value that is set to TRUE if the customer is permitted to purchase status items 550 and set to FALSE if the customer is not permitted to purchase status items 550. However, persons skilled in the art would recognize other implementations of the access to status items 535 value. In one embodiment, the access to status items 535 is set to allow customer 505 to purchase status items 550 if the customer 505 is a player 405 in the online virtual game of the server machine 105 and the player 405 has certain objectives met.

In one embodiment, customers who do not have access to status items 535 can only view the public items 545 in the online store 110, but cannot view the status items 550. Only customers who have access to status items 535 can view status items 550. In other words, according to one embodiment, the online store 110 includes two displays, a public display and a status display. The public display is for members of the public or customers 505 who do not have access to status items 535, and the status display is for customers 505 who have access to status items 535. Status items 550 are presented in the status display and are not presented in the public display.

In another embodiment, all customers can view status items 550 but only customers who have access to status items 535 can purchase status items 550. In other words, both the public display and the status display of the online store 110 include that status items 550, but only the status display allows customers 505 to purchase status items 550.

In yet another embodiment, a player, at a given time, has access to and purchases a particular status item included in the status items 550 but does not have access to a related status item included in the status items 550. In addition, within the online virtual game, the player receives a virtual status item indicative of the particular status item that he/she accesses within the status items 550. At a later time, based on the objectives met 425, the related status item included in the status items 550 can also be accessed by the player. The player can then purchase the related status item and combine the related status item with the previously-purchased status item to produce an upgraded status item. In addition, within the online virtual game, the player receives a virtual status item indicative of the related status item that he/she accesses within the status items 550, and, within the online virtual game, the two virtual status items are combined. For example, based on a particular objective that was met, the player of the pirate-type online virtual game is allowed to purchase a sword. Based on a different objective that was met at a later time, the player is then allowed to purchase a jewel frame that physically snaps on the purchased sword. The player can attach the jewel frame to the sword, and the "upgraded" sword indicates the achievements of the player in the physical and/or real world. In addition, within the online virtual game, a virtual sword given to the player when the first objective was met is combined with a virtual jewel frame given to the player when the second objective was met resulting in an "upgraded" virtual sword.

In one embodiment, a physical store having a brick and mortar presence, rather than an online store 110, implements the functionality described above. For the physical store, the indicia that a player has achieved an objective include, for example, a printable coupon, a coupon code, or a mobile phone-based coupon. As is well-known, in one embodiment, the physical store is a purely brick and mortar store with no online presence. In another embodiment, the physical store is a brick and mortar store that also has an online presence, and is configured to sell items both over the Internet and at the geographic locations of the physical store.

Figure 6:
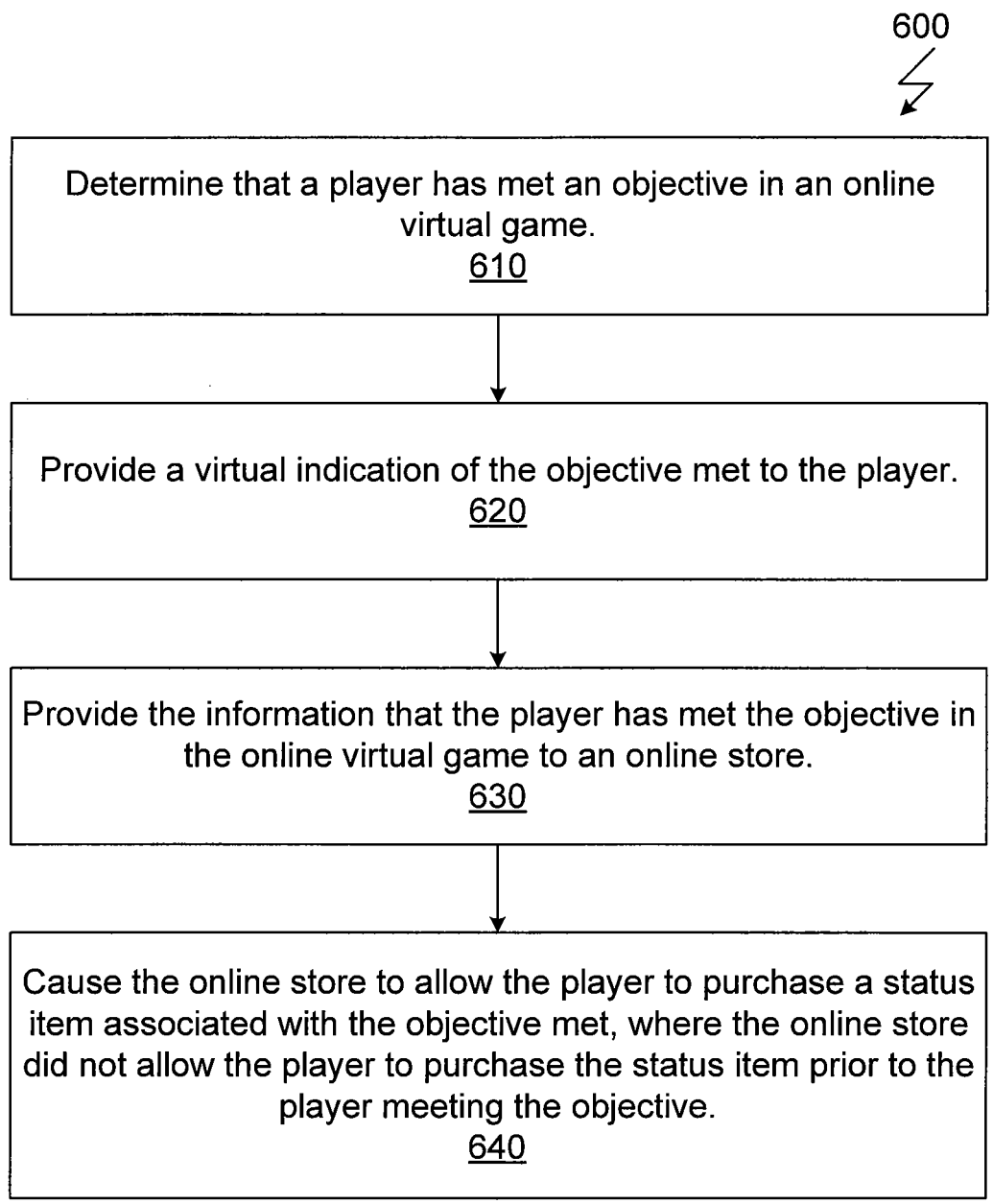
FIG. 6 is a flow diagram of method steps for allowing a player who has met an objective in an online virtual game to purchase a status item indicating the objective met, according to one embodiment of the present invention.

FIG. 6 is a flow diagram of method steps for allowing a player who has met an objective in an online virtual game to purchase a status item indicating the objective met, according to one embodiment of the present invention. Although the method steps are described in conjunction with FIGS. 1-5, persons skilled in the art will understand that any system configured to perform the method steps, in any order, falls within the scope of the present invention.

The method 600 begins at step 610, where the online virtual game module 330 determines that a player 405 has met an objective in an online virtual game. As a result, the objectives met 425 associated with the player 405 is updated to reflect that the player has met the objective.

The method 600 then continues to step 620 where the online virtual game module 330 provides a virtual indication of the objective met 425 to the player 405. In one embodiment, the virtual indication is an on-screen indication that is presented on the screen of the client computing device 130 via the online virtual game playing module 235.

The method 600 then continues to step 630, where the online virtual game module 330 provides the information that the player 405 has met the objective in the online virtual game to the online store 110. In response, the online store 110 associates the player 405 with a customer 505.

The method 600 then continues to step 640. In step 640, the online virtual game module 330 causes the online store 110 to allow the customer 505 (which corresponds to player 405) to purchase a status item 550 associated with the objectives met 425 of player 405. In one embodiment, the online store 110 allows the customer 505 to purchase a status item 550 after receiving the information that the player 405 has certain objectives met 425 in the online virtual game module 330. According to one embodiment, the online store 110 did not allow the customer 505 to purchase the status item 550 prior to the player 405 achieving the objectives met 425. According to one embodiment, the online store 110 allows customer 505 to purchase status items 550 by updating the value of access to status items 535 associated with customer 505. After step 640, the method 600 ends.

Persons skilled in the art will recognize that one or more aspects of the inventive concepts described herein may be implemented in various ways. For example, as set forth in one above embodiment, the online virtual game module 330 provides an indication that the player 405 has met an objective to the online store 110. This indication could be provided either immediately when the player 405 meets the objective, when the player 405 attempts to access a section of the online store 110 associated with a game of the online virtual game module 330, or at any other appropriate time.

In another example embodiment, the game server provides the indication that the player 405 has met an objective to the player 405 or to a machine being operated by the player 405. For example, the online virtual game module 330 may provide the player 405 with a text-based coupon code or stores a cookie on a client computing device 130 associated with the player 405, which is later provided to the online store 110. As one skilled in the art would understand, the coupon code or cookie provide an integration mechanism between the online store 110 and the online virtual game module 330, and any other integration mechanism may be used in place of the coupon code or cookie. In one embodiment, the cookie is encrypted in order to prevent or limit hacking and unauthorized purchases of status items. In one embodiment, the coupon code is generated by a coupon server separate from the server machine 105 and the online store 110. In one embodiment, the coupon code is associated with a token that contains an identifier of one or more status items 550 and auxiliary information.

In yet another example embodiment, a physical store is implemented instead of online store 110. The information that the player 405 has met the objective could be provided to the physical store via a printable coupon, a text coupon code, or a mobile phone-based coupon, such as a barcode or pictogram stored or displayed on a mobile device.

In sum, the approaches disclosed herein allow a player who has met an objective in an online virtual game to receive a physical and/or real world, as well as a virtual, indication of the objective met. Examples of objectives in online virtual games include reaching a certain level, defeating a certain number of opponents, or obtaining a certain ranking relative to the opponents. Specifically, in one approach an online virtual game module receives information that a player has met an objective in an online virtual game. The online virtual game module then provides a virtual indication of the objective met to the player. With one approach, the virtual indication appears on the computer screen of the player. Next, the online virtual game module provides the information that the player has met the objective to an online store. With one approach, the online store is associated with the online virtual game. Finally, the online virtual game module causes the online store to allow the player to purchase one or more status items associated with meeting the objective. Prior to the player meeting the objective in the online virtual game, the online store did not allow the player to purchase any status items. As a result, the one or more status items comprise a physical indication that the player has met the first objective. Also, the ability to purchase, and therefore the ownership of the status items conveys that the player met the objectives.

One advantage of the disclosed approach is that a player in an online virtual game can obtain status items that represent her accomplishments in the online virtual gaming environment and are not tied to a computer screen. As a result, the player in the online virtual game can more easily display her success in the game to her friends and family.

The scope of the present invention is determined by the claims that follow.

What is claimed is:

1. A method for enabling online purchases of physical status items associated with an entertainment platform, the method comprising:

determining, using a computing device, that a player of the entertainment platform has achieved a first non-monetary objective defined in the entertainment platform;

upon determining that the player has achieved the first non-monetary objective, providing an indicia within the entertainment platform that the player has achieved the first non-monetary objective and that a first physical status item that indicates achievement of the first non-monetary objective is available to be purchased as a reward for achieving the first non-monetary objective;

electronically transmitting, using the computing device, the indicia to a store, wherein in response to the indicia, the store is configured to:

display to the player only the first physical status item available as a reward for achieving the first non-monetary objective;

allow the player to purchase, using real-world currency, the first physical status item available as a reward for achieving the first non-monetary objective; and whereby the store does not allow a particular player to purchase, using real-world currency, a particular physical status item without actually having achieved a particular non-monetary objective associated with the particular physical status item; and determining, using the computing device, that the player has achieved a second non-monetary objective defined in the entertainment platform, informing the store that the player has achieved the second non-monetary objective, wherein the store is configured to allow the player to purchase a second physical status item for achieving the second non-monetary objective, the second physical status item is related to the first physical status item and, when purchased, is physically attachable to the first physical status item by the player.

2. The method of claim 1, wherein achieving the first non-monetary objective comprises reaching a first level in the entertainment platform, completing a first quest in the entertainment platform, defeating a first number of opponents in the entertainment platform, or obtaining a first ranking in the entertainment platform.

3. The method of claim 2, wherein the store comprises an online store, and, in a first instance, login information associated with the player and used for the entertainment platform is the same as login information associated with the player and used for the store.

4. The method of claim 3, wherein in a second instance, login information associated with the player and used for the entertainment platform is different from login information of the player and used for the store.

5. The method of claim 4, further comprising:
informing the store of the login information associated with the player and used for the entertainment platform prior to allowing the player to purchase the first physical status item.

6. The method of claim 1, wherein the indicia that the player has achieved the first non-monetary objective comprises a printable coupon, a mobile phone-based coupon or a coupon code.

7. The method of claim 6, wherein the store further comprises a physical store having a brick and mortar presence.

8. The method of claim 1, wherein the indicia that the player has achieved the first non-monetary objective comprises one of an electronic message transmitted to the online store, a cookie that is stored on a computer associated with the player and accessible to the online store, and a coupon code provided to the player.

9. A non-transitory computer-readable medium storing instructions that, when executed by a processing unit, cause the processing unit to perform the steps of:
determining using a computing device that a player of an entertainment platform has achieved a first non-monetary objective defined in the entertainment platform;
upon determining that the player has achieved the first non-monetary objective, providing an indicia within the entertainment platform that the player has achieved the first non-monetary objective and that a first physical status item that indicates achievement of the first non-monetary objective is available to be purchased as a reward for achieving the first non-monetary objective;
electronically transmitting the indicia to a store, wherein in response to the indicia, the store is configured to:
display to the player only the first physical status item available as a reward for achieving the first non-monetary objective;
allow the player to purchase, using real-world currency, the first physical status item available as a reward for achieving the first non-monetary objective; and
whereby the store does not allow a particular player to purchase, using real-world currency, a particular physical status item without actually having achieved a particular non-monetary objective associated with the particular physical status item; and
determining that the player has achieved a second non-monetary objective defined in the entertainment platform, informing the store that the player has achieved the second non-monetary objective, wherein the store is configured to allow the player to purchase a second physical status item for achieving the second non-monetary objective, the second physical status item is related to the first physical status item and, when purchased, is physically attachable to the first physical status item by the player.

10. The non-transitory computer-readable medium of claim 9, wherein achieving the first non-monetary objective comprises reaching a first level in the entertainment platform, completing a first quest in the entertainment platform, defeating a first number of opponents in the entertainment platform, or obtaining a first ranking in the entertainment platform.

11. The non-transitory computer-readable medium of claim 10, wherein in a first instance, login information associated with the player and used for the entertainment platform is the same as login information associated with the player and used for the store.

12. The non-transitory computer-readable medium of claim 11, wherein in a second instance, login information associated with the player and used for the entertainment platform is different from login information of the player and used for the store.

13. The non-transitory computer-readable medium of claim 12, wherein the instructions further comprise:
informing the store of the login information associated with the player and used for the entertainment platform prior to allowing the player to purchase the first physical status item.

14. A system, comprising:
a machine within which an entertainment platform module executes, wherein the entertainment platform module is configured to:
determine that a player of the entertainment platform has achieved a first non-monetary objective defined in the entertainment platform;
upon determining that the player has achieved the first non-monetary objective, provide an indicia within the entertainment platform that the player has achieved the first non-monetary objective and that a first physical status item that indicates achievement of the first non-monetary objective is available to be purchased as a reward for achieving the first non-monetary objective;
electronically transmit the indicia to a store, wherein in response to the indicia, the store is configured to:
display to the player only the first physical status item available as a reward for achieving the first non-monetary objective;
allow the player to purchase, using real-world currency, the first physical status item available as a reward for achieving the first non-monetary objective;
whereby the store does not allow a particular player to purchase, using real-world currency, a particular physical status item without actually having achieved a particular non-monetary objective associated with the particular physical status item; and determining that the player has achieved a second non-monetary objective defined in the entertainment platform, informing the store that the player has achieved the second non-monetary objective, wherein the store is configured to allow the player to purchase a second physical status item for achieving the second non-monetary objective, the second physical status item is related to the first physical status item and, when purchased, is physically attachable to the first physical status item by the player.

15. The system of claim 14, wherein the store is also executable within the machine.

16. The system of claim 15, wherein in a first instance, login information associated with the player and used for the entertainment platform module is the same as login information associated with the player and used for the store.

17. The system of claim 16, wherein the store is also executable within a second machine.

18. The system of claim 17, wherein in a second instance, login information associated with the player and used for the entertainment platform module is different from login information associated with the player and used for the store.

19. The system of claim 14, wherein the indicia coupon code provided to the player and to the store, and wherein the store is configured to allow the player to purchase, using real-world currency, the first physical status item available as a reward for achieving the first non-monetary objective when the player provides the coupon code to the store.

20. The method of claim 1, wherein the first physical status item resembles a first virtual item given to the player within the entertainment platform for achieving the first non-monetary objective, the second physical status item resembles a second virtual item given to the player within the entertainment platform for achieving the second non-monetary objective, and wherein the first and second virtual items are combinable within the entertainment platform.

21. The method of claim 1, further comprising determining, using the computing device, that the player has achieved a third non-monetary objective defined in the entertainment platform, informing the store that the player has achieved the third non-monetary objective, wherein the store is configured to allow the player to purchase a third physical status item for achieving the third non-monetary objective, the third physical status item is related to the first physical status item and the second physical status item and, when purchased, is physically attachable to the first physical status item or the second physical status item by the player such that the first physical status item, the second physical status item, and the third physical status item are combined.

* * * * *